（12） United States Patent
Viikari et al.

(10) Patent No.: US 7,908,241 B2
(45) Date of Patent: Mar. 15, 2011

(54) DATA PROCESSING SYSTEM

(75) Inventors: Mikko Viikari, Helsinki (FI); Hanno Nevanlinna, Espoo (FI)

(73) Assignee: Futurice Oy, Helsinki (FI)

( * ) Notice: Subject to any disclaimer, the term of this patent is extended or adjusted under 35 U.S.C. 154(b) by 451 days.

(21) Appl. No.: 10/588,890

(22) PCT Filed: Feb. 10, 2005

(86) PCT No.: PCT/FI2005/050022
§ 371 (c)(1),
(2), (4) Date: Jan. 5, 2007

(87) PCT Pub. No.: WO2005/078613
PCT Pub. Date: Aug. 25, 2005

(65) Prior Publication Data
US 2007/0174321 A1    Jul. 26, 2007

(30) Foreign Application Priority Data
Feb. 13, 2004    (FI) ...................................... 20040238

(51) Int. Cl.
*G06F 7/00* (2006.01)
(52) U.S. Cl. ....................................................... 707/602
(58) Field of Classification Search ............... 707/3, 602
See application file for complete search history.

(56) References Cited

U.S. PATENT DOCUMENTS

| | | | |
|---|---|---|---|
| 6,614,988 B1 | 9/2003 | Sampsell | |
| 6,636,259 B1 | 10/2003 | Anderson et al. | |
| 2001/0041020 A1 | 11/2001 | Shaffer et al. | |
| 2002/0013852 A1* | 1/2002 | Janik | 709/231 |
| 2002/0049603 A1* | 4/2002 | Mehra et al. | 705/1 |
| 2002/0054059 A1 | 5/2002 | Schneiderman | |
| 2002/0120757 A1 | 8/2002 | Sutherland et al. | |
| 2003/0083938 A1* | 5/2003 | Smith et al. | 705/14 |
| 2004/0043758 A1* | 3/2004 | Sorvari et al. | 455/414.1 |
| 2004/0070678 A1 | 4/2004 | Toyama et al. | |
| 2004/0111415 A1 | 6/2004 | Scardino et al. | |
| 2005/0216421 A1* | 9/2005 | Barry et al. | 705/64 |

FOREIGN PATENT DOCUMENTS

| | | |
|---|---|---|
| EP | 1 150 215 | 10/2001 |
| WO | WO 2004/100042 | 11/2004 |

OTHER PUBLICATIONS

About Fotki, Datasheet [ online]. Fotki, 1998 [retrieved on May 11, 2005]. Retrieved from the Internet:< URL:http//about.fotki.com>.
Proceedings of ACM CHI99 Conference on Human Factors in Computing Systms, 496-503, 1999, Allan Kuchinsky, Celine Pering, Michael L. Creech, Dennis Freeze, Bill Serra, Jacek Gwizdka, Fotofile: A Consumer Multimedia Organization and Retrieval System.

* cited by examiner

*Primary Examiner* — Charles Rones
*Assistant Examiner* — Fazlul Quader
(74) *Attorney, Agent, or Firm* — Young & Thompson (57) ABSTRACT

A data processing system (20) including a unit (29) producing data elements; data processing members (21) for processing the data elements; and a first data-base (22). A user is provided with at least a part of the content of the data element and the option of selecting the name information of at least one subscriber. The system fetches the address of the subscriber in the telecommunications system; generates metadata based on the address information; and attaches it to the data element. The attachment of person-based metadata to data elements becomes easier, and the processing of metadata during storage is improved.

26 Claims, 5 Drawing Sheets

DATA PROCESSING SYSTEM

BACKGROUND OF THE INVENTION

The invention relates to data processing systems and especially to using person-based metadata in data processing.

The amount of personal information processed daily has continued to increase after the introduction of digital data processing. For instance, the facts that digital cameras have become more common and their quality improved have changed the way people take photographs. They take large numbers of photographs, even thousands in a year, and want to look at them, process them and share them with others. It is clear that powerful tools are needed to manage the large daily amounts of information.

However, it has also been noticed that managing masses of photos by using automatic functions only is not sufficient. A computer can generate technical data related to the size, structure and transmission format of the information being processed, but a computer cannot efficiently process information on the basis of the significance attached to its content by the person using it.

To be able to fetch and browse digital data elements automatically, metadata need to be added to them, i.e. information about the data and especially about its content. There are two approaches to providing contentual metadata: the metadata can be automatically generated from the information or the user processing the information can be asked to attach, i.e. annotate, the metadata manually.

For instance, the metadata that can automatically be separated from a photograph by using current methods is typically not very abstract and of low quality, such as technically defined information on the colours, forms, and the like in the photograph. The metadata that is relevant for the user is, however, semantic by nature and more abstract. This means that users want information on for instance who the people are in the photo, or what they do. This difference between the automatically available metadata and the metadata required by the users is called a semantic gap.

Due to the above-mentioned problem, it is typically necessary to settle for the provision of manual (or semi-automatic/assisted) metadata. According to studies, users are very reluctant to annotate manually, because it is a time-consuming process that is susceptible to errors and considered boring. This problem is emphasized for instance when using a phone equipped with a camera, because the small display and limited input means of the phone make the annotation of photos difficult and slow it down. On the other hand, people feel that the annotated content is more useful and are later on pleased with having annotated their photos.

Publication "Requirements for Photoware" by David Frohlich, Allan Kuchinsky, Celine Pering, Abbe Don & Steven Ariss, Proceedings of the 2002 ACM conference on Computer supported cooperative work, examines the weaknesses and strengths of the present image material sharing methods and studies the needs of the users in processing image material through prioritization. The study recognizes the users' reluctance for manual annotation and recommends as a solution the use of collections and audio annotations attached thereto.

Publication "Ontology-based Photo Annotation" by A. Th. (Guus) Schreiber, Barbara Dubbeldam, Jan Wielemaker, and Bob Wielinga, IEEE Intelligent Systems, May/Jun. 2001, describes a photo annotation tool for processing photos in RDF (Resource Description Framework) file format. The description of the photo content is done using a model based on structural annotation by utilizing an ontology created for this purpose.

Publication "Direct Annotation: A Drag-and-Drop Strategy for Labeling Photos" by Den Scneiderman, Hyunmo Kang, IEEE International Conference on Information Visualisation (IV2000), describes a user interface in which an image or series of images can be annotated by attaching to them free text fields defined by the user and other information received through the user interface, such as dates and geographical information.

Contentual metadata created by different persons is generally not commensurable, because a common metadata ontology is not available. For instance, when processing image data, the same person can be referred to in different names and, on the other hand, one name can refer to several persons. Thus, it is not generally possible to utilize metadata created by other users in the prior art solutions.

For instance, the most typical subjects of personal photography are the people closest to the photographer and especially events where these people are present. Therefore, the most significant need for contentual metadata is also related to people and events. People are most interested in photos in which they are present or which relate to events they were participated in. Thus, when there are a lot of photos—as typically happens in the case of a digital camera and a phone equipped with a camera—the content of an individual photo is not primarily important for usability, but instead the possibility to easily fetch the photos related to a certain event or person. In existing solutions, the persons in the annotations need, however, to be annotated separately every time, or if a full-scale user interface is available, the annotation can be added from a drag-and-drop menu created in advance by the user. This is an arduous solution for the user, and it is, in practice, not feasible in the more limited user interfaces.

Photographs are often very personal and confidential by nature. Typically, there is a clear target group for the photos, which varies strongly between different photos of the same photographer. Often this target group is made up of the same people that were present in the event, for instance party, related to the photos. By modern methods, the sharing of even digital photos is difficult and is based primarily on sending separate image files by e-mail or storing them at a certain network address. In such cases, access to the image material is managed by other definitions than those related to the content of the photo.

In summary, a problem with the present data processing systems is that the person-based metadata that controls the later use of the information is needed in a format that is as widely recognized as possible, but so as to generate contentual metadata, the attachment of the metadata should be as user-friendly as possible. Attaching metadata should preferably be implemented over the simplest possible user interface, such as the user interface of a mobile terminal.

BRIEF DESCRIPTION OF THE INVENTION

It is an object of the invention to provide a method and a system implementing the method in such a manner that the above-mentioned problem is solved. The object of the invention is achieved by a method, system, and program product that are characterized by what is stated in the independent claims. Preferred embodiments of the invention are disclosed in the dependent claims.

The invention is based on attaching person-based metadata to data elements, and in attaching the metadata, an address database available to the subscriber is used, the database containing a title and address given by the subscriber to the targets to identify the targets in a specific telecommunications system. The attachment of metadata is then based on name data identifying the data transmission target, which is managed by the subscriber in connection with the use of the telecommunications system and is often also defined by the user. However, the actual metadata that is attached to the data element for use in later actions contains specific address information according to the telecommunications system, which thus already initially is in a widely known format.

An advantage of the method and system of the invention is that attaching person-based metadata to data elements becomes easier and, at the same time, the processing and the control of the processing of the metadata improves.

BRIEF DESCRIPTION OF THE FIGURES

The invention will now be described in greater detail by means of preferred embodiments and with reference to the attached drawings, in which.

DETAILED DESCRIPTION OF THE INVENTION

The present invention can be applied to any data processing system that contains the elements described in independent claim 1. The following is a general description of the system of the invention with reference to FIG. 1.

Figure 1:
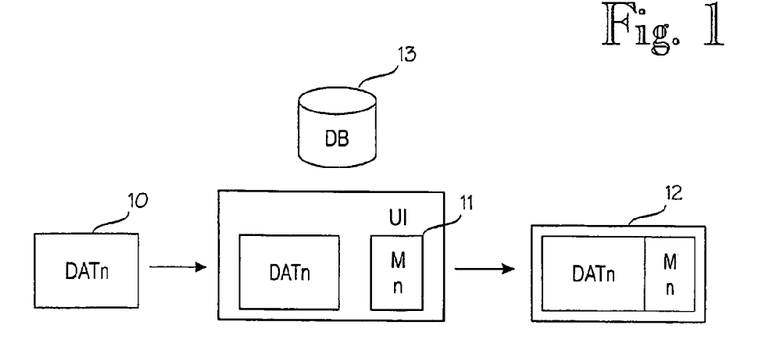
FIG. 1 is a general block diagram of the system of the invention.

The system of the invention relates to functionality, in which metadata is attached to a first data element 10. The first data element 10 corresponds to a data set that is examined and processed substantially as one entity in the system. The first data element 10 can be received to the system from outside or it may be generated inside the system. The first data element 10 processed at each time is provided through the user interface of the system to a user who attaches at least one metadata element 11 to it with a user interface function. This metadata element 11 is initially defined on the basis of the content of the first data element.

Metadata substantially indicates the context of information, and it is processed during data transfer substantially in the same manner as content, even though it is not actually part of the content. Examples of metadata of different type include, illustrated with image data terms:

contentual metadata that indicates what can be seen in the photo, contextual metadata that indicates for instance where, when and in what context the photo was taken, technical metadata that indicates for instance which device was used to take the photo, what opening was used, and what the exposure time was, format metadata that indicates for instance the size and colour amount of the photo, DRM (Digital rights management) metadata that indicates for instance who took the photo, who owns the right to it, and what it costs, publication metadata that indicates who has the right to view and edit or use the photo, process metadata that indicates the process step to which the image data is related.

In relation to data transfer, metadata can thus be essentially interpreted as information transported with the payload, but invisible to the data transfer protocol. Metadata is not as such suitable for addressing in connection with data transfer.

After attaching the metadata, the first data element 10 and the metadata element 11 form a second data element 12 that can be processed as a data element essentially as one entity in data transfer and storage. Metadata can, however, be processed separately in connection with specific reference functions, for instance read and fetch functions, relating to the content of the data element, which speeds up the execution of such actions.

So that the attachment of metadata was as easy as possible for the user, the user is offered the option of attaching person-based contentual metadata to a data element in the present invention. Said metadata is offered to the user as a selection option based on the name information of the subscriber. The name information being offered is stored in an address data register combining a selection name and address information, which in FIG. 1 is illustrated with the database 13. Due to this, an individual user may define a context for the data element on the basis of information that is significant to him. It is clear that this information is hardly ever commensurate with information significant to other users.

The address information related to the selected name information is fetched from the database 13 and, with it, the selection of the user can be converted into metadata of a generally known format. The metadata attached to a data element can be generated on the basis of the address information by using the address information directly as metadata, or for instance by attaching to the address information an identifier that is correspondingly delivered to the user identified by the address information. Interface means for providing the user with the name information stored in the database and for receiving the definitions related to the information from the user are initially included into several data processing systems, so the invention can be taken into use quickly and inexpensively.

Figure 2:
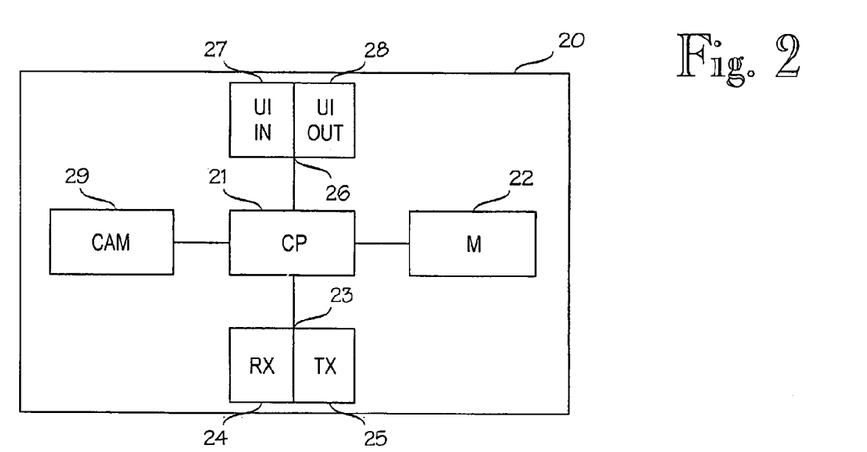
FIG. 2 is block diagram of a preferred embodiment of the system of the invention.

In the following, the invention will be illustrated with reference to FIG. 2 by means of a preferred embodiment thereof, without, however, limiting the invention to this embodiment or the terms used in this description. To simplify the description, the drawings only show the parts that are essential for the description of the invention. It is apparent that actual systems may contain numerous parts known to a person skilled in the art, so they need not be described herein. In the embodiment of FIG. 2, a mobile station 20 of a mobile system corresponds to the data processing system of the invention. It should be noted that even though the separate system elements shown in the present example are integrated into one physical device, this is not essential for the invention. The described logical system elements can be fixed to each other or at least some of them may be detachable depending on the situation.

FIG. 2 is a block diagram that illustrates the functional structure of a mobile station. It is apparent to a person skilled in the art that a mobile station is essentially an entity made up of hardware comprising electronic parts and circuit arrangements and software controlling the operation of the hardware parts, and has several possible implementations. The mobile station 20 comprises a processor or processing means 21, i.e. a part that may contain an arithmetic-logic unit, a set of registers and control circuits. Attached to the processing means are memory means 22, i.e. data medium, in which machine-code information, programs, or subscriber information can be stored. The data medium typically comprises read-write memory units (read-write memory, RAM) and read memory units (read only memory, ROM). The mobile station also contains an interface unit 23 comprising input means 24 for receiving information for the functions executed by the mobile station, and output means 25 for outputting information processed by the mobile station. Examples of the subunits of the interface unit include a transmitter/receiver unit of the mobile station and a plug-in unit in the mobile station, which acts as a processing gateway for information transmitted to external connection points. The mobile station also comprises a user interface 26 through which the mobile station can receive commands given by the user and display the desired information to the user. The user interface 26 typically comprises one or more input devices 27, such as a keyboard, touch screen, microphone, or the like. The user interface 27 typically also comprises at least one output device 28, such as display, loudspeaker, or the like. The processing means 21, memory means 22, interface unit 23, and user interface 26 are electrically connected to each other for systematically performing actions directed to received and/or stored data according to predefined and substantially programmed procedures. In the system of the invention, such actions comprise performing the mobile station functionalities described above and in the following.

In the embodiment of FIG. 2, a camera unit 29 connected to the mobile station 20 acts as the unit producing the data elements of the invention. For processing the data elements, the media type associated with the data element is not significant to the invention, so a unit producing the data elements in the system of the invention can be any physical hardware element or logical functional unit capable of producing a data set forming the data element. An audio storage unit and a hardware and application entity for editing photos displayed on a display are examples of this. To speed up data processing, the data elements are preferably generated in digital format.

The camera unit 29 stores at a specific time instant and typically in response to the triggering function of the user the photo information received through the lens of the camera and modifies it into a data set in digital format, i.e. an image element. The camera unit 29 is connected to the processing means 21 of the mobile station and receives the data element recorded by the camera for further processing.

In the present embodiment, the processing means 21 of the mobile station identify the received data element as image data and output the recorded image through the user interface 26 on the display of the mobile station serving as the output means, thus offering the user the option of adding to the data element metadata associated with the content of the data element.

The memory of the mobile station contains a phone list that typically contains information on persons significant to the subscriber and their telecommunications addresses in at least one telecommunications system. The subscriber's address information is preferably referred to with an identifier containing the subscriber's name in a format familiar to the subscriber, for instance the name the user of the mobile station has given to the subscriber during storage. In the present embodiment, the processing means then display together with an image a view of the subscriber's phone list, especially of the stored name information.

Figure 3:
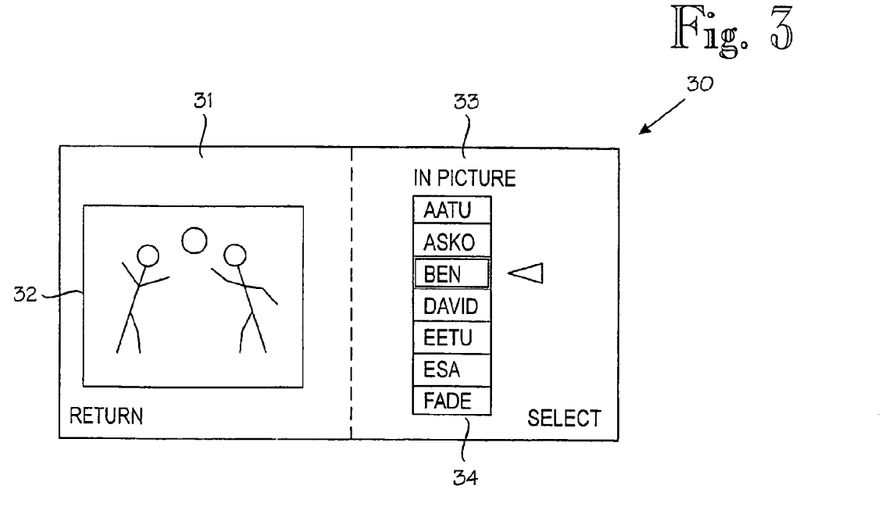
FIG. 3 is the view that the mobile station user sees in a preferred embodiment of the system of the invention.

A selection view of the user of the mobile station according to the present embodiment is illustrated in FIG. 3. The display 30 of FIG. 3 contains two sections, and the image data element 32 recorded by the camera unit is displayed on the first section 31. The second section 33 of the display 30 displays a selection view 34 of the phone list in the mobile station. When the subscriber sees these two sections, he also sees that the image shows his two friends playing ball and can decide to attach metadata related to the friends to the image.

The selection view typically only displays a part of the name information in the phone list, and the rest of the phone list can be scrolled into view by using an operating function of the display. The operating functions of a display are known to a person skilled in the art, and their implementation is not described in more detail in this context. By means of the display sections shown in FIG. 3, the user of the mobile station then moves the cursor to 'BEN', confirms the selection of the name information by pressing the SELECT key, moves the cursor to 'AATU', confirms the selection of the name information by again pressing the SELECT key, and ends the selection by pressing the RETURN key. It is apparent to a person skilled in the art that selection views contain several functionalities and can be implemented in several different ways without departing from the scope of protection of the present invention.

In the present embodiment, the user interface 26 of the mobile station transmits the definitions from the selection view to the processing unit 21. The processing unit 21 fetches from the phone list in the memory 22 the subscriber address of the telecommunications system related to the name 'BEN'. The subscriber address refers herein to a data structure or logical conversion used to identify a single object, such as a certain user, network device, or process; examples of this include an international subscriber number (MSISDN, mobile subscriber international ISDN number), an URL (uniform resource locator) address, and an e-mail address. In the example of FIG. 3, the address is the international subscriber number of the mobile station subscriber (MSISDN). Thus, the processing unit combines the image data element recorded by the camera unit and the MSISDN numbers of Ben and Aatu used as metadata in this embodiment. It should be noted that the metadata need not necessarily be the subscriber address, but it can also be an identifier related to the subscriber address, from which the information is transmitted to the user identified by the subscriber address.

Figure 4:
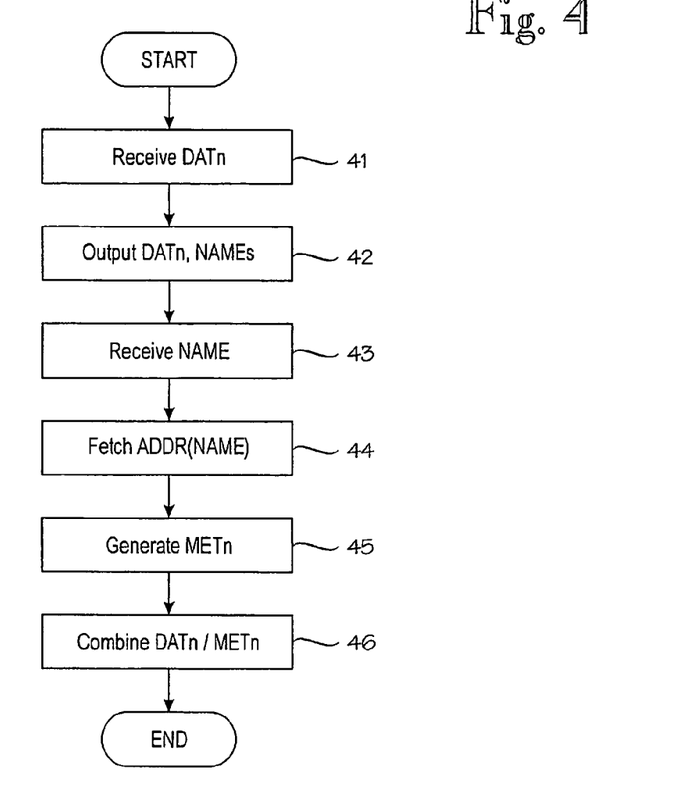
FIG. 4 is a flow chart illustrating a data processing method of the embodiment shown in FIG. 3.

The data processing method described above using FIG. 3 is illustrated next with reference to the flow chart of FIG. 4. In step 41, a data element DATn generated using the camera unit is received. In step 42, the data element DATn is displayed on the display of the mobile station together with a selection view NAMEs formed of the search names of the subscribers. In step 43, one or more selection definitions NAME provided by the subscriber are received, and in step 44, the address information ADDR(NAME) corresponding to the selection definition is fetched. In step 45, metadata METn is generated on the basis of the address data ADDR(NAME), and in step 46, the data element DATn and metadata METn are combined.

The present embodiment thus shows the advantages provided by the solution of the invention in processing data elements. The metadata attached to the data elements is readily available to the user utilizing telecommunications systems, and reference to the data is done in a manner known to the user. It should be noted that even though the names in the phone list are defined by the user in the described embodiment, this is not essential to the invention. The phone list may also be an address file available to the user, which the user can access through a selection view.

Attaching metadata by using the method of the invention is easy and possible even through a limited user interface, like in a mobile station. The definition made by the user is, however, automatically converted in the address file into a widely known format, which enables referring to the information in an efficient manner and is even definable specifically for each data element. The solution of the invention can thus be said to offer global ontology for one of the most important types of contentual metadata.

As mentioned above, attaching metadata to a data element permits many different actions for the further processing of information. Generated information equipped with metadata is typically stored for later use into a database. In the example of FIG. 3, an image data block formed by the image data element and metadata can primarily be stored in an image databank in the memory 22 of the mobile station. The memory of a mobile station is, however, limited and access to it is restricted, so the interface unit 23 of the mobile station offers the option of storing the data block into a database through which other users, too, can access the image data.

Figure 5:
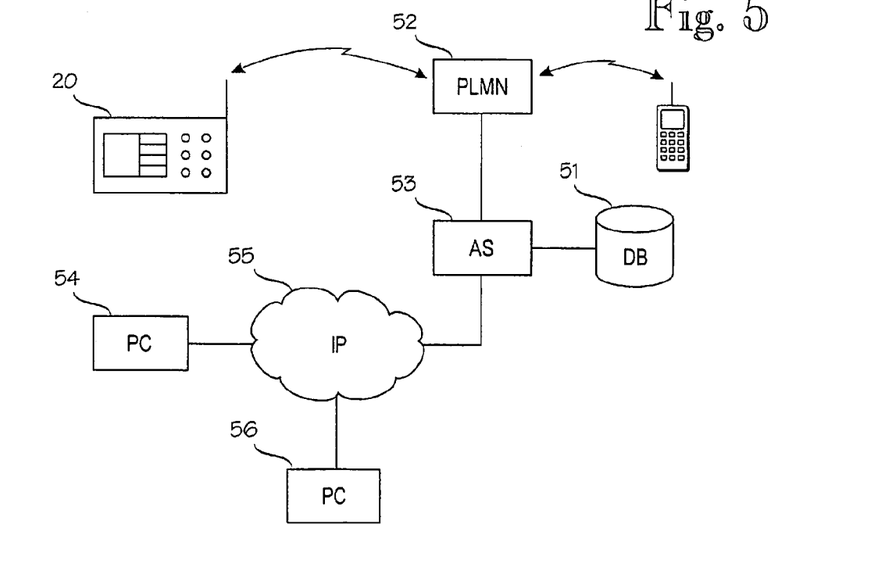
FIG. 5 is a block diagram of a second preferred embodiment of the system of the invention.

This type of arrangement is illustrated in FIG. 5, further applying the operating environment of the embodiment of FIG. 3. The embodiment shown in FIG. 5 comprises as an example of a data processing system a mobile station 20, an image databank 51, 53 for storing recorded images, and a telecommunications arrangement 52, 54, 55 for transmitting the images from the mobile station 20 to the image databank 51, 53. To simplify the description, the drawings only show the parts that are essential for the invention. It is apparent that actual systems can contain numerous components known to a person skilled in the art, so they need not be described in this context.

Figure 6:
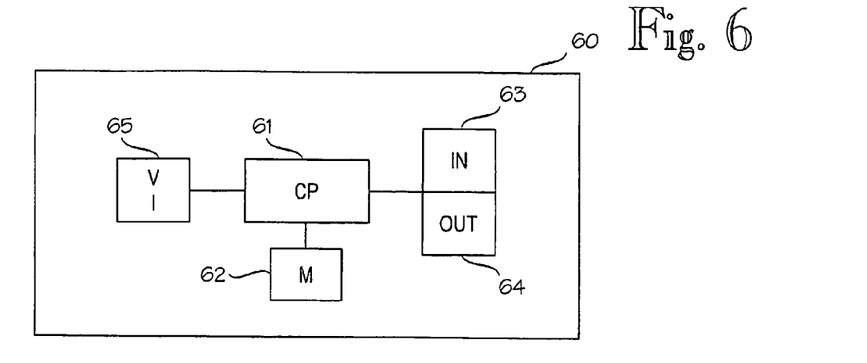
FIG. 6 is a block diagram of a preferred embodiment of a server of the invention.

In the example of FIG. 5, the image databank is a database system that comprises an image data server 53 and an image database 51. The image data server 53 takes care of specific tasks guided by requests from computers connected to the same network or for them. The block diagram of FIG. 6 illustrates the functional structure of the server 53 of FIG. 5. The server 53 is essentially an entity made up of hardware comprising electronic parts and circuit arrangements and software controlling the operation of the hardware parts, and has several possible implementations. The server 53 comprises a processor or processing means 61, i.e. a part that may contain an arithmetic logic unit, a set of registers and control circuits. Memory means 62, i.e. a data medium for storing machine-code data, programs, or subscriber data, are connected to the processing means. The data medium typically comprises read-write memory units (read-write memory, RAM) and read memory units (read only memory, ROM). The server 53 also contains an interface unit comprising input means 63 for receiving information for the functions executed by the server, and output means 64 for outputting the information processed by the server. An example of the input means is a plug-in unit in the server hardware, which acts as the processing gateway for information directed to its external connection points.

To permit control and monitoring functions for the user of the server, the server may also contain a user interface 65, through which the server receives commands from the user and outputs the desired information for the user. The user interface typically comprises an input device, for instance a keyboard, touch screen, microphone, or the like. The user interface typically also comprises at least one output device, for instance a printer, display, loudspeaker, or the like. The processing means 61, memory means 62, interface unit 63, 64, and user interface 65 are electrically interconnected for the systematic execution of actions directed to received and/or stored data according to predefined, substantially programmed procedures. In a system of the invention, such actions include the execution of the server functionalities described above and in the following. These functionalities comprise storing the image data elements delivered to the image data server into the image database 51, fetching image data elements from the image database 51, and the access control of these actions.

The database 51 is essentially an entity of the information describing a specific target area, which is used and updated by one or more applications. Databases are known to a person skilled in the art and need, therefore, not be explained in more detail herein. A record in the database 51 contains information related to one individual, event, or other limited unit, and presented in the same context, in which case one image data element and the metadata attached to it are both essentially in one record.

The embodiment of FIG. 5 shows two data transmission arrangements for transmitting an image data element generated in the mobile station 20 to the database 51. It is apparent to a person skilled in the art that a data transmission arrangement may comprise any fixed or wireless network connection, or a combination thereof. The first of the data transmission arrangements of FIG. 5 is a public land mobile network (PLMN) serving as the home network of the mobile station. Examples of such networks include the Global System for Mobile Communications (GSM), and corresponding mobile systems, such as GSM 1800 and PCS (Personal Communication System), and systems based on the above-mentioned systems, such as the GSM 2+ systems. These also include systems called the third-generation mobile systems, such as Universal Mobile Telecommunications System (UMTS). In the embodiment of FIG. 5, PLMN refers to a GSM-based system that contains a packet-switched data service (General Packet Radio Service, GPRS). In the present embodiment, the mobile network in question provides a data transmission service between the mobile system 20 and an image data server in the form of a GPRS packet data protocol context (PDP context). The recorded image data element can thus be transmitted from the mobile station 20 over a radio interface to a mobile network that transmits it to an image data server 53 connected to the mobile network.

The second of the data transmission arrangements of FIG. 5 contains a computer 54 connected to the image data server 53 over a fixed network connection 55, and the mobile station 20 can be connected to it at least during the transmission of image data elements. It is apparent to a person skilled in the art that there are several methods for connecting the mobile station 20 and computer 54, including a conductor, infrared, and Bluetooth arrangement, and the like. In a manner known per se, the mobile station 20 and computer 54 have complementary interface ports in accordance with the selected connection method.

It should be noted that the embodiment of FIG. 5 provides the user of the mobile station at least two user interface alternatives for attaching metadata to image data elements.

The user may attach metadata to an image data element with the mobile station according to the embodiment of FIG. 3, or transmit the recorded image data element from the mobile station to the computer 54 and attach the metadata to the image data element by using the often more versatile user interface of the computer. In such a case, one should, however, make sure that the computer has access to the phone list, i.e. database, whose records comprise at least information on the subscriber of the telecommunications system and the address of the subscriber in the telecommunications system. A computer interface software is typically provided with mobile stations for synchronizing the data, such as calendar and contact data, stored on the mobile station with the applications used with the computer. Access to the database is thus preferably permitted through a parallel phone list stored in the computer. It is apparent to a person skilled in the art that access to the database from the computer 54 can be arranged in many different ways without departing from the scope of protection.

Data transmission connection between the computer 54 and image data server 53 can be any connection-oriented or connectionless network service. Examples of this include fixed networks, including IP-based local area networks, wide area networks (WAN), and the like. Other examples include mobile networks, such as the GSM (Global System for Mobile Communications) system, and corresponding systems, such as GSM 1800 and PCS (Personal Communication System), and systems based on them, such as GSM 2+. These include systems known as the third-generation mobile systems, such as the Universal Mobile Telecommunications System (UMTS).

The application of the embodiment of FIG. 3 as applied to the embodiment of FIG. 5 progresses as follows. The camera unit of the mobile station 20 records the image element, and its processing means identify the received data element as image data and store or output it into the memory of the mobile station 20. At a given moment, the user of the mobile station 20 connects the mobile station to the computer 54 and transmits at least part of the image data elements stored in the memory of the mobile station over the established data transmission connection to the computer 54. The computer 54 runs an application that displays the image elements over a user interface to the user and offers the option of the attaching metadata related to its content to the data element.

For instance, in connection with the transfer of the image elements, as a separate action, or in connection with another action requiring the connection of the mobile station 20 to the computer 54 (for instance, the synchronization of data in the mobile station and computer), a phone list of the mobile station subscriber is stored into the memory of the computer, the list containing information on persons significant to the subscriber and their telecommunications addresses in at least one telecommunications system. According to the present embodiment, the user is provided with the image data element and a view to the phone list of the subscriber.

Figure 7:
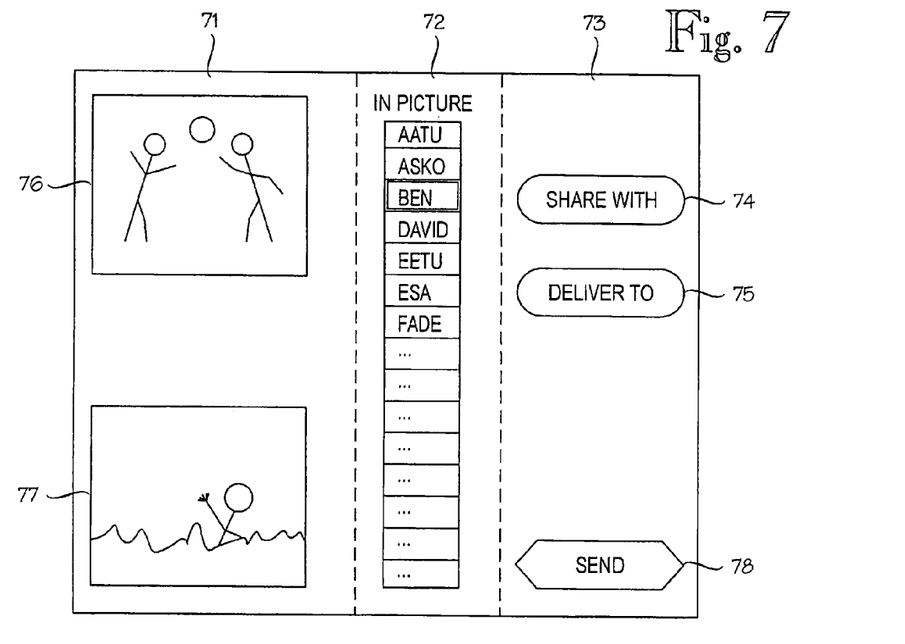
FIG. 7 the view that the mobile station user sees in a second preferred embodiment of the system of the invention.

Because the display of a computer is typically larger than the display of a mobile station and the processing of selection views can be arranged to be more flexible, several image data elements can be processed side by side on the same display. The user interface of the computer also enables more flexible selection functions, which provides more alternatives for entering definitions related to the later use of the metadata. This is illustrated in FIG. 7, in which the display comprises a first section 71, in which the image data elements (two in the example of FIG. 7) to be processed are outputted. A selection view 34 to the phone list of the mobile station is outputted in the second section 72 of the display. When the subscriber sees these two sections, he also sees that the first image shows two of his friends playing ball and the second image shows a third friend swimming, and the user can decide to attach metadata related to the friends to the image. In the present embodiment, the third section 73 of the display shows a selection view concerning definitions relating to the use of metadata.

In the example of FIG. 7, the third section 73 of the display contains by way of example a definition 74 'SHARE WITH', which, if selected, adds an additional definition to the image data element, providing access for the subscribers connected to the image element through the metadata to the stored image data element in the image database 51 through the image data server 53. The second definition 75 in the third section of the display is 'DELIVER TO', which, if selected, causes the image data server to start at a specific moment, for instance in response to the reception of the image element, the transfer of the image element to the subscriber connected to the image element through the metadata. It is apparent that more definitions related to the use of metadata can be developed as needed. It should also be noted that in this embodiment, the definitions are provided directly in connection with the attachment of person-based metadata. However, the arrangement of the invention also permits the attachment of additional definitions to the data elements at later stages. This way, the user can primarily attach to the data element information on the persons to whom the image may relate (not necessarily only the persons in the photo), and with said additional definition, the user could later control access to the image element or its processing on the basis of the person-based metadata.

Using these examples, the following describes the attachment of metadata and definitions related to the use of the metadata by means of the display sections shown in FIG. 7. The user of the mobile station first selects, for instance with a mouse, a first image element 76, selects 'BEN' from the phone list, clicks the 'IN PICTURE' button, selects 'AATU' from the phone list, again clicks the 'IN PICTURE' button and also the 'SHARE WITH' button. After this, the user selects a second image element 77, selects 'FADE' from the phone list, clicks the 'IN PICTURE' button and also the 'DELIVER TO' alternative, and then ends the selection function, for instance by starting the transmission of the image elements to the image data server by clicking the transmission confirmation button 78. It is apparent to a person skilled in the art that the selection views contain several functions and they may be implemented in many different ways without departing from the scope of protection of the present invention.

As a result of the selections described above, the computer 54 fetches from the phone list the MSIDSN numbers associated with the names BEN and AATU, generates person-based metadata from this address information, and attaches the metadata to the first image element 76. This embodiment uses directly the MSISDN number as the metadata generated from the address information. In addition to this, the computer 54 attaches to this information an additional definition related to the access control of the image element data so as to provide access to the subscriber identified by the metadata of the person indicated by the user with the name information AATU. The computer 54 also fetches from the database the MSISDN number associated with the name FADE, attaches this address as person-based metadata to the second image element 77, and attaches to this information an additional definition related to the sharing of the image element. The thus formed data blocks are then transmitted over the telecommunications network 55 from the computer 54 to the image data server 53 that stores them into the image database 51.

In the present embodiment, the image data server 53 is also arranged to read from the received image data blocks possible additional definitions related to the processing of the metadata. In response to receiving an image data block related to the second image data element 77, the image data server 53 begins establishing a connection to the subscriber identified by the name 'FADE' by the user. In the present arrangement, sharing does not require new database searches or address conversions, but sharing can directly be implemented on the basis of the metadata attached to the image data element, herein the MSISDN number of FADE.

As mentioned above, the second computer 56 or mobile station 57 connected to the image data server 53 can through the image data server 53 fetch image data elements from the image database 51. In the present embodiment, the image data server 53 is also arranged to check using the definition related to metadata processing that the subscriber requesting the image data element has the right to use the image data elements. For instance, in the case of FIG. 7, primarily the user of the mobile station and, on the basis of the definitions, the MSISDN number associated by the user to the AATU name have access to the first image data element 76. It should be noted that, in this example, the MSISDN number represents an example of an identification mechanism, which as such does not restrict access only to the user terminals operating through the MSISDN address. When operating from another computer, the MSISDN number can be used as a username, for instance, or a specific username can be associated with a specific MSISDN number on the server. Further, if the metadata contains an identifier generated on the basis of the subscriber's address, access rights can be checked on the basis of this identifier.

The embodiment described above represents other advantages achieved with the solution of the invention. Attaching person-based metadata makes it possible to automatically combine photos taken by several users of the same event into one entity, which was not possible earlier. Person-based metadata can also be utilized when creating automatic access control and sharing rules to replace actions that earlier were performed manually.

In the embodiments described above, the primary metadata generated from address information was supplemented with metadata related to the utilization of the primary metadata in processing stored image elements. It should be noted that the primary metadata can also be supplemented with other information related to the application context of data elements. With the present invention, it is possible to do this automatically, as a user function, or as a combination of both.

Figure 8:
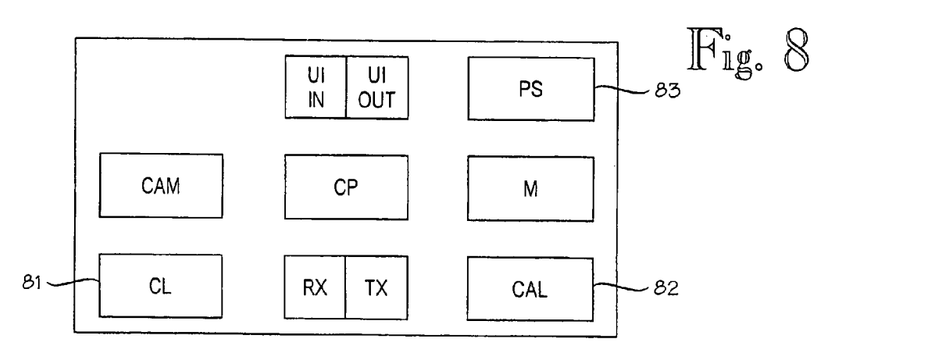
FIG. 8 is a block diagram of a second preferred embodiment of the system of the invention.

FIG. 8 illustrates a mobile station of the embodiment of FIG. 2, which, in addition to the elements described in FIG. 2, comprises a clock unit 81, a calendar unit 82, and a positioning unit 83 connected electrically to them.

According to studies, people usually arrange their photos by events and chronologically. According to studies, photos are taken in series, i.e. several photos within a short time, in such a manner that there may be long intervals between photographing periods. These series typically coincide with distinct events that the user can easily identify and name, such as holiday trips, parties, anniversaries, and various changes in life. The clock unit 81 contains a known timing unit that inserts into each recorded image element the time when it was recorded. In the present embodiment, the clock unit also monitors during the recording of the image elements the time interval between the image element being stored and the previous image element. If the time interval is shorter than a given reference value, such as a predefined limit value, or a dynamic reference value defined by a cluster algorithm, the most recently recorded image is considered to belong to the same image series with the earlier image element. If the time interval is longer than the predefined limit value, the most recently recorded image element is considered to start a new, separate image series. The clock unit inserts into the image data element metadata that identifies the image series to which the image data element belongs. This metadata can be utilized in the further processing of image series made up of sets of image data elements, which speeds up the processing of large numbers of photos and assists in using hierarchical structures in making definitions. For instance, it is possible to provide a functionality for the metadata attachment step, in which the image elements of one image series are processed as one series, and, correspondingly, the fetching of stored image data elements can simply be directed to an entire image series. Such clustering of image elements can be done automatically, or the subscriber can be offered the option of inputting or editing image series through the user interface.

The calendar unit 82 contains a known calendar application that associates the time of the event with the name of the event marked therein. In the present embodiment, the calendar unit also defines with the clock unit during the recording of the image elements the recording time and fetches from the calendar of the user the event name associated with the storage time. Metadata generated from the name can be utilized in combining the image data elements of different users, which assists in processing large numbers of image elements and/or the image elements of several subscribers. For instance, a conference invitation distributed over e-mail is typically shown in the same format in the calendars of the attendees. By attaching this calendar information as metadata during the conference permits an easy storage and sharing of the conference information, and facilitates access control to the image data elements stored in the image database. Such use of calendar information as metadata can be arranged to be automatic, or the subscriber can be offered the option of inputting or editing metadata generated from the calendar information through the user interface.

The positioning unit 83 contains a known positioning system, for instance the global positioning system (GPS) or an application utilizing the positioning function of the GSM networks, which defines the location of the mobile station at each time instant. In the present embodiment, the positioning unit defines the location information of the recording place by means of the positioning system during the recording of the image elements and attaches the location information as metadata to the image elements. This metadata can be utilized to combine the processing of the image elements of one or more users and related to the same location, which facilitates and speeds up the processing considerably. By attaching this location information of the recording place as metadata, it is possible to fetch and process together image elements equipped with the metadata containing the location information of the summer cottage.

Figure 9:
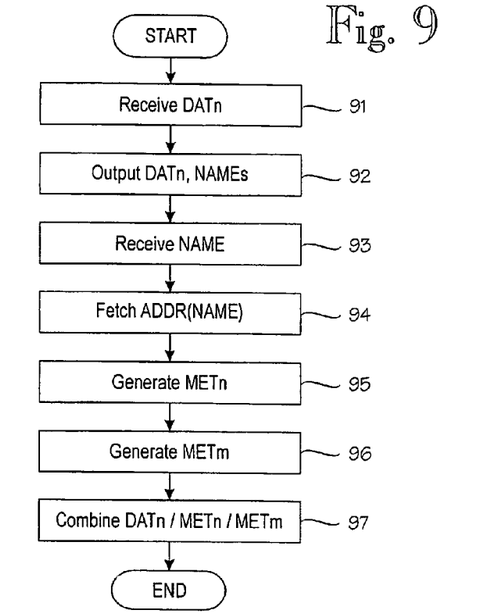
FIG. 9 is a flow chart illustrating an embodiment of a method for implementing the embodiment alternatives shown in FIG. 8.

FIG. 9 illustrates as a combination an embodiment of the method for implementing the embodiment alternatives shown in FIG. 8 at the end where the metadata is attached to the data elements. In step 91, the data element DATn generated with the camera unit is received. In step 92, the data element DATn is outputted on the mobile station display together with the selection view NAMEs generated from the subscribers' search names. In step 93, one or more selection definitions NAME provided by the subscriber are received, and in step 94, the address information ADDR(NAME) corresponding to the selection definition is fetched. In step 95, the metadata related to the address information ADDR(NAME) is generated, and in step 96, any other metadata METm related to the application context of the data element, such as the coordinate of the recording place, cluster information, or a calendar definition, is generated as shown in FIG. 8. In step 97, the data element DATn, generated person-based metadata MRT, and metadata METn related to the application context are combined. The attachment of the context-based metadata of the present embodiment takes place in a user-friendly manner, and combined with the person-based metadata, it offers significant additional possibilities for further processing data elements.

Figure 10:
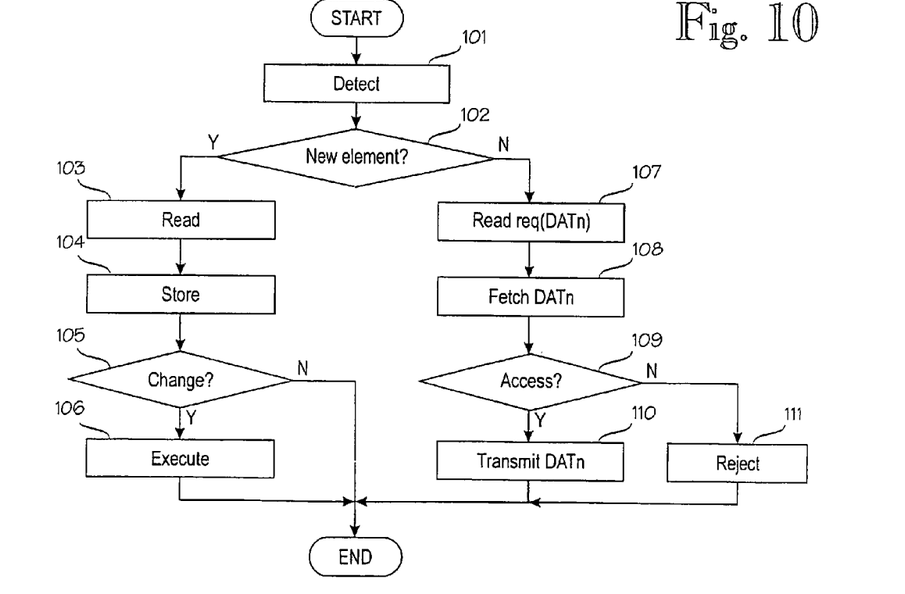
FIG. 10 is a flow chart illustrating an embodiment of a method of the invention executed in a data server processing data elements.

FIG. 10 illustrates in a corresponding manner an embodiment of a method of the invention at the end where the data server processes the data elements. In step 101, the server detects the reception of a data block containing a data element. In step 102, the server checks, whether the data block is related to new information to be stored or whether it is a fetch request for information stored in the database. If it is a data block containing one or more new data elements, the routine moves to step 103, where the data element and the related metadata is read, and in step 104, the data element is stored with the metadata into the database. In step 105, the routine checks, whether the data block contains definitions requiring other actions, such as the request described in FIG. 7 to share the image element with a user defined by means of the metadata. If such definitions do not exist, the processing of the received data block ends. Otherwise, the routine moves to step 106, in which the actions approved in step 105 are performed, after which the processing of the received data block ends.

If this is a fetch request for information stored in the database, the routine moves to step 107, in which the request is read, the image element or elements related to it are identified, and the identifier related to the address information of the user sending the request is defined. In step 108, the requested data elements and the related metadata are fetched from the database. In step 109, on the basis of the user identifier and the access-control metadata attached to the data element, the routine checks, whether the requestor has access to the requested image elements. If the requestor is entitled to access the image elements, they are transmitted in step 110, and the processing of the data block ends. Otherwise, the server informs the requestor in step 111 that the request is rejected, and the processing of the data block ends. Automatic processing of data elements of the present embodiment at the server end improves the processing of the data elements and significantly facilitates the processing of large numbers of photos.

Figure 11:
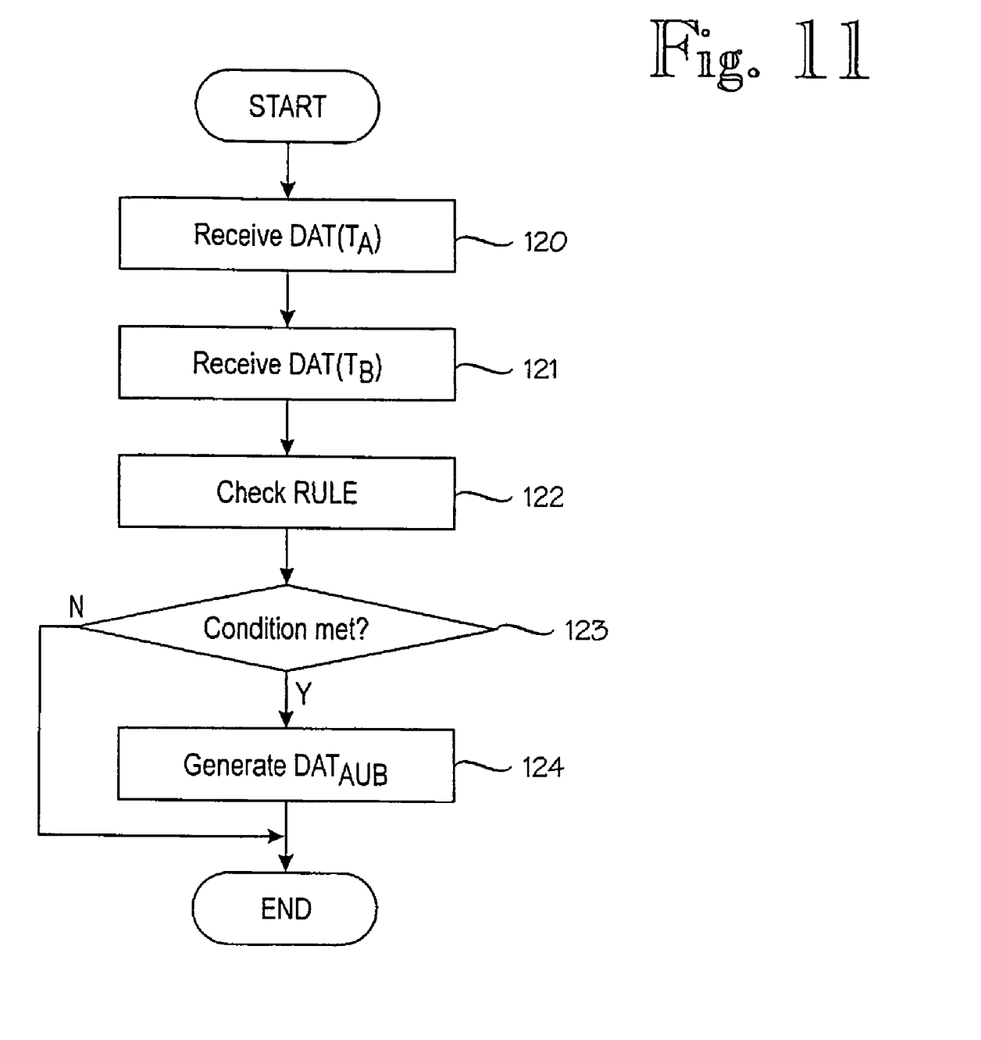
FIG. 11 is a flow chart illustrating a second embodiment of a method of the invention executed in a data server processing data elements.

FIG. 11 illustrates in a corresponding manner an embodiment of a method of the invention at the end where the data server processes the data elements. The present embodiment illustrates the automatic combining of photos taken independently by two different subscribers. In step 120, the server receives from user A a set of image data elements having attached thereto person-based metadata identifying person B, context metadata indicating that the image elements belong to the same cluster related to time interval $T_A$, and an additional definition, on the basis of which the user shares the image element with person B. In step 121, the server receives from user B a set of image data elements having attached thereto person-based metadata identifying person A, context metadata indicating that the image elements belong to the same cluster related to time interval TB, and an additional definition, on the basis of which the user shares the image element with person A. In step 122, the server checks the combination rule RULE, which in this example defines that the image element series, which have at least partly overlapping time intervals and which are defined as shared, are to be combined.

If the conditions of the combination rule are met, the server combines the image elements received in step 120 and 121 into an image set to be processed as one entity and to which both person A and person B have access.

The present embodiment shows the advantage provided by the solution of the invention, in which data elements generated independently by several users can be automatically combined. This speeds up and simplifies the processing of the data elements and improves significantly the processing of large numbers of photos. The present embodiment only describes the parts that are essential to the specification of the embodiment. It is apparent to a person skilled in the art that the data elements can be combined separately and in series, for instance by utilizing image series, positioning or calendar metadata. There may be more than two users, whose data elements or data element series are combined. The processed information may be other than image data, as is also the case elsewhere in the application.

It should also be noted that the combination of data elements can also be provided for users, i.e. RULE can be interpreted as a rule controlling an automatic function or a combination function performed by a user. Each user can then select through the user interface a set of data elements, make them into one collection, and define access to the collection by means of person-based metadata. The data element set used in assembling the collection can be a data element set generated by the user, or it may contain data elements from other sources. The user may, for instance, assemble an image series that contains his own photos and other photos to which he has access and which were taken by others at the same event. According to the invention, this solution provides the extra advantage that the processing of data elements becomes easier and sharing is improved due to the metadata attached to individual data elements and collections.

It is apparent to a person skilled in the art that as technology advances, the basic idea of the invention can be implemented in many different ways. The invention and its embodiments are thus not limited to the examples described above but may vary within the scope of the claims.

The invention claimed is:

1. A system comprising:
    a database system for storing data elements;
    a data processing system for processing data elements, the data processing system being associated to a first subscriber of a telecommunications system;
    the data processing system comprising;
        a first database configured to store records, a record containing a name data field including name information given by the first subscriber to an other subscriber of a telecommunications system, and an address data field including a subscriber address of the other subscriber, in the telecommunications system; and
        interface means containing output means for outputting information to the first subscriber and input means for receiving as input information from the first subscriber; and
    the database system comprising a server and a second database, wherein said output means are arranged to output to the first subscriber at least a part of a content of a first data element in connection with at least one selection option including one or more name data fields of the first database;
    said input means are arranged to receive from the first subscriber a selection of a name data field of at least one other subscriber;
    the data processing system is, in response to the selection of the name data field by the first subscriber, arranged to fetch from the first database a subscriber address stored in the address data field in the record of the selected name data field; and to attach the fetched subscriber address to the first data element as person-based metadata such that the fetched subscriber address and the first data element form a second data element that is processed in data transfer as one payload entity that is invisible to the data transfer protocol;

the data processing system is arranged to send the second data element to the database system;

the database system, is arranged to receive a fetch request for a first data element from a second subscriber accessing the database system; and to check the access right of the second subscriber to the first data element by comparing the subscriber address of the second subscriber with the subscriber address included as person-based metadata in the second data element.

2. The data system as claimed in claim 1, wherein said output means are also arranged to provide the first subscriber with the option of attaching to the first data element an additional definition controlling its access right;

said input means are arranged to receive as input from the first subscriber said additional definition;

said data processing system is arranged to attach said additional definition as further metadata to the first data element such that the fetched subscriber address, the first data element and the additional definition form a second data element that is processed in data transfer as one payload entity that is invisible to the data transfer protocol.

3. The data system as claimed in claim 1, wherein said output means are also arranged to provide the user with the option of attaching to the data element an additional definition controlling a function to be implemented during its storage;

said input means are arranged to receive as input from the user said additional definition;

said data processing means are arranged to attach said additional definition as further metadata to the data element such that the fetched subscriber address, the first data element and the additional definition form a second data element that can be processed in data transfer as one payload entity that is invisible to the data transfer protocol.

4. The data system as claimed in claim 3, wherein the database system is arranged to receive said additional definition; and, in response to the received additional definition, to execute during storage the function defined by the additional definition.

5. The data system as claimed in claim 4, wherein said function includes transmitting the first data element to at least one subscriber identified by the address in the telecommunications system comprised in the person-based metadata.

6. The data system as claimed in claim 1, wherein the data processing system also comprises a clock unit for defining the generation time of the first data element, the clock unit being also arranged to attach to the first data element as further metadata a data series identifier;

measure a time interval to the first data element;

compare the measured time interval between a later first data element and the first data element with a predefined reference value;

attach, in response to undershooting the reference value, to the later first data element the same identifier as to the earlier first data element; and attach, in response to exceeding the reference value, to the later first data element a different identifier than to the earlier first data element.

7. The data system as claimed in claim 1, wherein the data processing system also comprises a calendar unit, the calendar unit being also arranged to:

detect the generation time of the first data element;

fetch a calendar event corresponding to the generation time;

attach said calendar event as metadata to the first data element.

8. The data system as claimed in claim 1, wherein the data processing system also comprises a positioning unit, the positioning unit being also arranged to:

generate location information on a system element containing the positioning unit at the generation time of the data element;

attach said location information as metadata to the data element.

9. The data system as claimed in claim 1, wherein said data elements contain image data.

10. A mobile station comprising:

a unit for producing data elements;

data processing means for processing data elements;

interface means containing output means for outputting information to a first subscriber using the mobile station and input means for receiving, input information from the first subscriber using the mobile station;

a phone list storing records, a record containing a name data field including a name of another subscriber in a form input by the first subscriber, and an address data field including the address of the other subscriber in the mobile communications system; wherein said output means are arranged to output to the first subscriber at least part of the content of a first data element in connection with a view to name fields of the phone list;

said input means are arranged to receive as input from the first subscriber a selection of a name data field of at least one other subscriber;

said data processing means are, in response to the selection of the name data field, arranged to fetch from the phone list a subscriber address stored in the address data field in the record of the selected name data field; and to attach the fetched subscriber address to the first data element as person-based metadata such that the fetched subscriber address and the first data element form a second data element that can be processed in data transfer as one payload entity that is invisible to the data transfer protocol;

said data processing means are arranged send the second data element to another database system accessible via the mobile communication system.

11. A method for processing data in a system comprising a database system for storing data elements and a data processing system for processing data elements, the data processing system being associated to a first subscriber of a telecommunications systems, the method comprising;

maintaining records in a first database of the data processing system, a record containing a name data field including name information given by the first subscriber to a subscriber of a telecommunications system, and an address data field including a subscriber address of the same subscriber in the telecommunications system;

outputting in the data processing system to the first subscriber at least part of the content of a first data element in connection with the option including one or more name data fields of the first database;

receiving in the data processing system from the first subscriber a selection of a name data field of at least one other subscriber;

fetching in the data processing system from the first database a subscriber address stored in the address data field in the record of the selected name data field;

attaching in the data processing system the fetched subscriber address to the first data element as person-based metadata such that the fetched subscriber address and the first data element form a second data element that can be processed in data transfer as one payload entity that is invisible to the data transfer protocol;

sending the second data element with the attached person-based metadata from the data processing system to the database system;

receiving in the database system a fetch request for the first data element from second subscriber;

checking in the database system the access right of the second subscriber with the data element by comparing the subscriber address of the second subscriber with the subscriber address included as person-based metadata in the second data element.

12. The method as claimed in claim 11, further comprising providing in the data processing system the first subscriber with the option of attaching to the first element an additional definition controlling its access right;

receiving as input from the first subscriber said additional definition;

attaching said additional definition as further metadata to the first data element such that the fetched subscriber address, the first data element and the additional definition form a second data element that can be processed in data transfer as one payload entity that is invisible to the data transfer protocol.

13. The method as claimed in claim 11, further comprising providing in the data processing system the first subscriber with the option of attaching to the first data element an additional definition controlling a function executed during the storage of the data element;

receiving as input from the first subscriber said additional definition;

attaching said additional definition as further to the data element such that the fetched subscriber address, the first data element and the additional definition form a second data element that can be processes in data transfer as one payload entity that is invisible to the data transfer protocol.

14. The method as claimed in claim 13, further comprising receiving in the database system said additional definition; and, in response to the received additional definition, executing said function during storage.

15. The method as claimed in claim 14, further comprising executing in the database system said function by transmitting the first data element to the second subscriber identified by the subscriber address in the telecommunications system contained in the person-based metadata.

16. The method as claimed in claim 12, further comprising:
defining in the data processing system the generation time of the data element;
attaching in the data processing system to the data element further metadata containing an identifier that identifies a data series to which the data element belongs;
measuring in the data processing system a time interval between a later first data element and the first data element;
comparing in the data processing system the measured time interval with a predefined reference value;
attaching in the data processing system, in response to undershooting the reference value, to the later first data element the same identifier as to the earlier first data element; and
attaching in the data processing system, in response to exceeding the reference value, to the later first data element a different identifier than to the earlier first data element.

17. The method as claimed in claim 12, further comprising:
detecting in the data processing system the generation time of the first data element;
fetching in the data processing system a calendar event corresponding to the generation time of the first element;
attaching in the data processing system to the first data element further metadata containing said calendar event.

18. The method as claimed claim 12, further comprising:
generating in the data processing system location information of the system element that generated the first data element at the time of generation of the first data element:
attaching to the first data element further metadata containing said location information.

19. A computer-readable medium having computer-executable instructions for performing the method of
operating as a mobile station of a mobile communications systems, the mobile station being configured for producing and processing data elements;
outputting information to a first subscriber and receiving information from the first subscriber using the mobile station;
storing records in a phone list, a record containing a name data field including a name of another subscriber in a form input by the first subscriber, and an address data field including the address of the other subscriber in the mobile communications system; outputting to the first subscriber at least part of the content of a first data element in connection with a view to name fields of the phone list;
receiving as input from the first subscriber a selection of a name data field of at least one other subscriber;
fetching, in response to the selection of the name data field, from the phone list a subscriber address stored in the address data field in the record of the selected name data field; and to attach the fetched subscriber address to the first data element as person-based metadata such that the fetched subscriber address and the first data element form a second data element that can be processed in data transfer as one payload entity that is invisible to the data transfer protocol;
sending the second data element to a database system accessible via the mobile communications system.

20. A network element of a telecommunications system, the network element comprising:
first interface means for receiving data elements;
user interface means for outputting information to the user of the network element and receiving input information from the user of the network element; wherein
the network element is connected to a first database for access to a phone list of a first subscriber of a telecommunications system, the phone list storing records, a record containing a name data field including a name of another subscriber in a form input by the first subscriber, and an address data field including the address of the other subscriber in telecommunications system;

said output means are arranged to output to the user of the network element at least a part of the content of a first data element in connection with a view to name fields of the phone list of the first subscriber;

said input means are arranged to receive as input from the first subscriber a selection of a name data field of at least one other subscriber;

said data processing means are, in response to the selection the name data field, arranged to fetch from the first database fetch from the first database a subscriber address stored in the address data field in the record of the selected name data field; and to attach the fetched subscriber address to the first data element as person-based metadata such that the fetched subscriber address and the first data element form a second data element that can be processed in data transfer as one payload entity that is invisible to the data transfer protocol;

said data processing means are arranged send the second data element to another database system accessible via the telecommunications system.

21. A database system of a telecommunications system, the database system comprising a database and a server, wherein the server comprises first interface means for receiving from a first subscriber a first payload entity, a second payload entity, each payload entity comprising a subscriber address, in a specific telecommunications system as person-based metadata; and data processing means arranged to check whether received payload entities comprise an additional definition controlling the access right to information included in the payload entity;

execute said access right control to information included in a payload entity in response to the an additional definition being comprised in the payload entity;

check whether additional definitions in a first payload entity and a second payload entity simultaneously meet a specific combination rule;

combine, in response to additional definitions in a first payload entity and a second payload entity simultaneously meeting the specific combination rule, the first payload entity and a second payload entity into a data set to be processed as one entity.

22. The database system as claimed in claim 21, wherein the combination rule of the data processing means is a functionality stored in the data processing means, and the data processing means are arranged to check the combination rule in response to receiving payload entities.

23. The database system as claimed in claim 21, wherein said interface means are arranged to receive the combination rule from a user of the database system.

24. A computer program product encoding a computer process of instructions for executing a computer process for processing data in a system, the process comprising:

maintaining records in a first database of a data processing system associated to a first subscriber of a telecommunications system, at least part of the records of the first database comprising name information given by the first subscriber to the one or more other subscribers of a telecommunications system and subscriber addresses of the one or more other subscribers in the telecommunications system:

outputting to the first subscriber at least a part of the content of the data element in connection with the option of selecting name information of the one or more other subscribers;

receiving from the first subscriber a selection of name information of at least one other subscriber;

fetching from the first database, a subscriber address related to the selected name information;

attaching to the data element person-based metadata that contains the fetched subscriber address;

sending the data element with the attached person-based metadata to a database system connected to the system, the database system comprising a server and a second database; and receiving a data element fetch request from a computer connected to the server; and checking the access right to the data element by comparing the subscriber address attached to the fetch request with the person-based metadata of the data element.

25. The data system as claimed in claim 2, wherein said output means are also arranged to provide the user with the option of attaching to the first data element a further additional definition controlling a function to be implemented during its storage;

said input means are arranged to receive as input from the user said additional definition;

said data processing means are arranged to attach said additional definition as further metadata to the data element such that the fetched subscriber address, the first data element and the additional definitions form a second data element that is processed in data transfer as one payload entity that is invisible to the data transfer protocol.

26. A computer-readable medium having computer-executable instructions for performing the method of operating as a network element of a telecommunications system;

receiving data elements;

outputting information to the user of the network element and receiving input information from the user of the network element;

connecting to a first database for access to a phone list of a first subscriber of a telecommunication system, the phone list storing records, a record containing a name data field including a name of another subscriber in a form input by the first subscriber, and an address data field including the address of the other subscriber in telecommunications system;

outputting to the user of the network at least a part of the content of a first data element in connection with a view to name fields of the phone list of the first subscriber;

receiving as input from the first subscriber a selection of a name data field of at least one other subscriber;

fetching, in response to the selection the name data field, from the first database a subscriber address stored in the address data field in the record of the selected name data field; and attaching the fetched subscriber address to the first data element as person-based metadata such that the fetched subscriber address and the first data element form a second data element that is processed in data transfer as one payload entity that invisible to the data transfer protocol;

sending the second data element to another database system accessible via the telecommunications system.

* * * * *